(12) United States Patent  
Ying et al.

(10) Patent No.: US 12,503,075 B2  
(45) Date of Patent: Dec. 23, 2025

(54) METHOD FOR CREATING AND MANAGING VIRTUAL KEY, APPARATUS, AND COMPUTER READABLE STORAGE MEDIUM

(71) Applicant: PATEO CONNECT+ TECHNOLOGY (SHANGHAI) CORPORATION, Shanghai (CN)

(72) Inventors: Zhenkai Ying, Shanghai (CN); Hongren Shi, Shanghai (CN)

(73) Assignee: PATEO CONNECT+TECHNOLOGY (SHANGHAI) CORPORATION, Shanghai (CN)

( * ) Notice: Subject to any disclaimer, the term of this patent is extended or adjusted under 35 U.S.C. 154(b) by 757 days.

(21) Appl. No.: 17/768,434

(22) PCT Filed: Dec. 9, 2019

(86) PCT No.: PCT/CN2019/124108  
§ 371 (c)(1),  
(2) Date: Apr. 12, 2022

(87) PCT Pub. No.: WO2021/082195  
PCT Pub. Date: May 6, 2021

(65) Prior Publication Data  
US 2024/0116475 A1 Apr. 11, 2024

(30) Foreign Application Priority Data

Oct. 30, 2019 (CN) .......................... 201911044568.2  
Oct. 30, 2019 (CN) .......................... 201911045988.2

(51) Int. Cl.  
*B60R 25/24* (2013.01)  
*G07C 9/00* (2020.01)  
*H04L 9/08* (2006.01)

(52) U.S. Cl.  
CPC ........ *B60R 25/241* (2013.01); *G07C 9/00309* (2013.01); *G07C 9/00563* (2013.01); *H04L 9/0825* (2013.01); *G07C 2209/63* (2013.01)

(58) Field of Classification Search  
CPC .............. B60R 25/241; G07C 9/00309; G07C 9/00563; G07C 2209/63; H04L 9/0825  
See application file for complete search history.

(56) References Cited

U.S. PATENT DOCUMENTS

2015/0310681 A1 10/2015 Avery et al.  
2016/0026605 A1 1/2016 Pandit et al.  
(Continued)

FOREIGN PATENT DOCUMENTS

CN 106408700 2/2017  
CN 106408700 A 2/2017  
(Continued)

OTHER PUBLICATIONS

Identity Based Encryption (IBE), https://web.archive.org/web/20190629113217/https://doubleoctopus.com/security-wiki/encryption-and-cryptography/identity-based-encryption/ (Year: 2019).*  
(Continued)

*Primary Examiner* — Aryan E Weisenfeld  
(74) *Attorney, Agent, or Firm* — Nixon Peabody LLP; Jeffrey L. Costellia

(57) ABSTRACT

A method for creating and managing a virtual key, a device, and a computer readable storage medium. The method comprises: in response to determining that a distance between a user device and a vehicle is less than a predetermined value, sending a request to install a vehicle key application to the user device, the user device being associated with the car; in response to detecting that the vehicle key application is installed in the user equipment unit device, sending a verification request to the user device via  
(Continued)

the vehicle key application; acquiring verification information specific to the verification request from the user device; and in response to determining that the verification information specific to the verification request matches information pre-stored in a server, creating a vehicle key at the vehicle key application in the user device, the vehicle key being configured to control the vehicle.

14 Claims, 6 Drawing Sheets

(56) References Cited

U.S. PATENT DOCUMENTS

| | | | |
|---|---|---|---|
| 2016/0217635 A1 | 7/2016 | Pudar et al. | |
| 2017/0308365 A1 | 10/2017 | Cermak et al. | |

FOREIGN PATENT DOCUMENTS

| | | |
|---|---|---|
| CN | 106408714 | 2/2017 |
| CN | 107292998 | 10/2017 |
| CN | 107315601 | 11/2017 |
| CN | 108122311 | 6/2018 |
| CN | 108122311 A | 6/2018 |
| CN | 108661462 | 10/2018 |
| CN | 109285252 | 1/2019 |
| CN | 109389712 | 2/2019 |
| CN | 109727358 A | 5/2019 |
| CN | 109808643 | 5/2019 |
| CN | 109936833 | 6/2019 |
| CN | 109951277 | 6/2019 |
| CN | 110091828 | 8/2019 |
| CN | 110126782 | 8/2019 |
| CN | 110197328 | 9/2019 |
| CN | 110798795 | 2/2020 |
| JP | 2016-138377 | 8/2016 |
| WO | 2017207641 A1 | 12/2017 |

OTHER PUBLICATIONS

Chinese Office Action for Application No. 201911045988.2, mailed Mar. 28, 2022.(4 pages).
Chinese Office Action for Application No. 201911044568.2, mailed Mar. 11, 2022 (5 pages).
Chinese Search Report for Application No. 201911045988.2, dated filed Oct. 30, 2019 (2 pages).
Chinese Search Report for Application No. 2019110445682, mailed Oct. 30, 2019 (2 pages).
Chinese Notice for Application No. 201911045988.2, mailed Sep. 3, 2021 (5 pages).
Chinese Notice for Application No. 201911044568.2, mailed Aug. 31, 2021 (5 pages).
International Search Report for Application No. PCT/CN2019/124108, mailed Jul. 31, 2020 (8 pages).
European Search Report for App. No. 19950903.5, dated Feb. 14, 2024 (20 pages).

* cited by examiner

METHOD FOR CREATING AND MANAGING VIRTUAL KEY, APPARATUS, AND COMPUTER READABLE STORAGE MEDIUM

TECHNICAL FIELD

The embodiments of the present disclosure relate to the field of vehicles, and more particularly relates to a method and a device for creating and managing a virtual key, and a computer-readable storage medium.

BACKGROUND

With the continuous advancement of science and technology, there are more and more intelligentized computing devices applied to transport means, especially vehicles. The introduction of virtual keys of the vehicles will make providers of vehicle sharing services and fleet operators more flexible in controlling the vehicles.

Existing virtual keys of the vehicles have the following disadvantages. Firstly, the process of creating the virtual keys of the vehicles is cumbersome. Secondly, once a user device is lost, the risk of vehicle theft will increase. Thirdly, existing methods still can't make users or service providers effectively share the virtual keys of the vehicles with other users. Therefore, it is necessary to create a solution for quickly and safely creating the virtual keys of the vehicles.

Moreover, the virtual key is usually a software program installed in a mobile device or a wearable device, and can communicate with a vehicle control system through various communication technologies. The virtual key may be used to realize multiple control functions (for example, unlocking/locking doors, starting vehicles, opening and closing windows, or the like). In a case where a vehicle owner needs to share the vehicle with others, how to share the virtual key with the user or between different terminal devices of the same user in a more convenient and safe way has become a problem to be solved.

SUMMARY

The present disclosure proposes a solution for creating a vehicle key, which can quickly and safely create and share the vehicle key.

According to a first aspect of the present disclosure, a method for creating a vehicle key is provided, including: in response to determining that a distance between a user device and a vehicle is less than a predetermined value, sending a request to install a vehicle key application to the user device, the user device being associated with the vehicle; in response to determining that the vehicle key application is installed in the user device, sending, via the vehicle key application, a verification request to the user device; acquiring verification information specific to the verification request from the user device; and, in response to determining that the verification information specific to the verification request is matched with information pre-stored in a server, creating a vehicle key at the vehicle key application of the user device, the vehicle key being configured for controlling the vehicle.

The present disclosure also provides a solution for managing a virtual key of an object, which can still use the object conveniently and safely by using different terminals under a virtual key sharing scenario.

According to a second aspect of the present disclosure, a method for managing a vehicle key of an object is provided.

The method includes: at a mobile device, receiving first verification information from a server and related to a first user device of the object; determining whether the received first verification information is matched with second verification information related to the to-be-used mobile device of the object; in response to determining that the first verification information is mismatched with the second verification information, sending a virtual key request to the server, the virtual key request including an identifier of the object; and receiving a virtual key response from the server, the virtual key response including the virtual key of the object, so that the mobile device is capable of using the virtual key to open the object.

According to a third aspect of the present disclosure, a method for managing a vehicle key of an object is provided. The method includes: at a server, receiving a virtual key request from a to-be-used user device of the object, the virtual key request including an identifier of the object; on the basis of the identifier of the object, acquiring the virtual key of the object; and sending a virtual key response, the virtual key response including the virtual key of the object, so that the user device is capable of using the virtual key to open the object.

According to a fourth aspect of the present disclosure, an electronic device is provided, including: at least one processing unit; and at least one memory, wherein the at least one memory is coupled to the at least one processing unit and stores any method according to any one of the first aspect, the second aspect and the third aspect executed by the at least one processing unit.

According to a fifth aspect of the present disclosure, a computer storage medium is provided. The computer storage medium has a computer-readable program instruction stored thereon, wherein the computer-readable program instruction is configured for executing the method according to the first aspect.

The summary part is provided to introduce the selection of concepts in a simplified form, which will be further described in the following detailed description. The summary part is not intended to identify key features or essential features of the present disclosure, and is also not intended to limit the scope of the present disclosure.

BRIEF DESCRIPTION OF THE DRAWINGS

Through the more detailed description of the embodiments of the present disclosure in conjunction with the drawings, the above and other objectives, features, and advantages of the present disclosure will become more apparent. In the embodiments of the present disclosure, the same reference numerals generally represent the same components.

DETAILED DESCRIPTION

Figure 1:
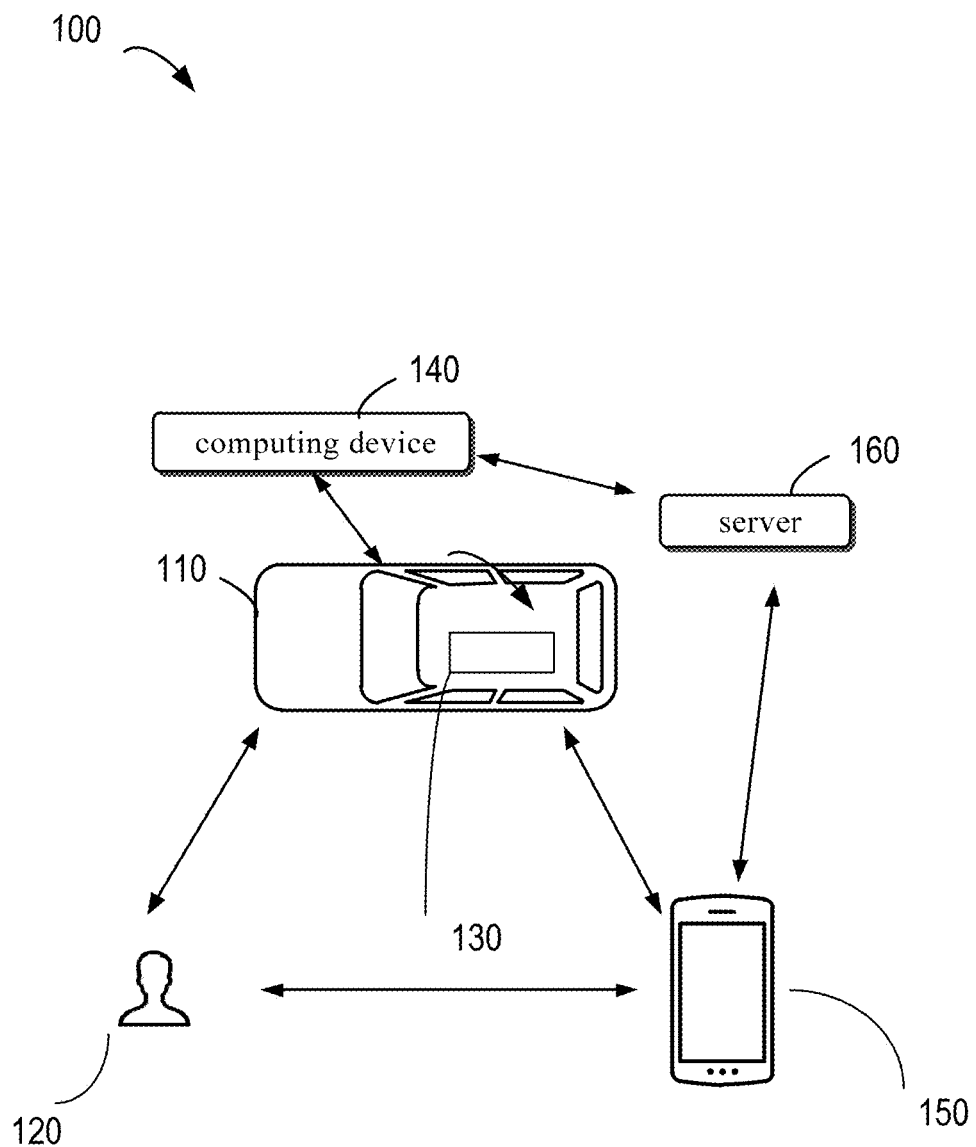
FIG. 1 illustrates a schematic diagram of an environment 100 in which the embodiments of the present disclosure can be implemented.

The preferred embodiments of the present disclosure will be described in further detail hereinafter with reference to the drawings. Although the preferred embodiments of the present disclosure are shown in the drawings, it should be understood that the present disclosure may be embodied in various forms and should not be construed as limited to the embodiments set forth herein. On the contrary, these embodiments are provided to make the present disclosure more thorough and complete, and to fully convey the scope of the present disclosure to those skilled in the art.

The term "including" and similar terms thereof used herein represents open inclusion, which means, "including but not limited to". Unless specifically stated, the term "or" represents "and/or". The term "based on" represents "at least partially based on". The term "one exemplary embodiments" or "one embodiment" represent "at least one exemplary embodiment". The term "another embodiment" represents at least one other embodiment. The terms "first", "second", or the like, may refer to different or identical objects. Other explicit and implicit definitions may be probably included below.

Upon research, it is found that in the traditional solution of creating a vehicle key, when a driver approaches a vehicle, an on-board sensor will automatically identify a mobile phone, and the vehicle will be unlocked after a vehicle owner is identified to be correct. To prevent unauthorized users from using the vehicle, for example, the virtual key is generated on the basis of a user name and a password input by the user in a user device to control the vehicle. In the traditional solution of creating the vehicle key, there are shortcomings in the rapidity and safety aspects of creating the vehicle key. Moreover, the user or a service provider cannot effectively share the virtual key of the vehicle with other users.

According to an embodiment of the present disclosure, a method for creating a vehicle key is provided. The method includes: in response to determining that a distance between a user device and a vehicle is less than a predetermined value, sending a request to install a vehicle key application to the user device, the user device being associated with the vehicle; in response to determining that the vehicle key application is installed in the user device, sending, via the vehicle key application, a verification request to the user device; acquiring verification information for the verification request from the user device; and, in response to determining that the verification information specific to the verification request is matched with information pre-stored in a server, creating a vehicle key at the vehicle key application of the user device, the vehicle key being configured for controlling the vehicle.

In the foregoing solution, when the user device is close enough to the vehicle, after confirming that the user device is installed with the vehicle key application, and confirming that the verification information replied by the user device specific to the sent verification request is matched with the information stored in the server, the vehicle key is created in the application, so that the present disclosure is convenient for the user to quickly create the vehicle key. In addition, the created vehicle key can be safely shared.

As described above, the virtual key may be used to realize multiple control functions (for example, unlocking/locking doors, starting vehicles, opening and closing windows, or the like). In a case where a vehicle owner needs to share the vehicle with others, how to share the virtual key to the user in a more convenient and safe way has become a problem to be solved.

Moreover, it is found upon research that in a virtual key sharing scenario, after the user obtains the virtual key from the vehicle owner (i.e., a provider of the object) through the user device and uses the vehicle, the user device needs to be changed for some reason. Therefore, in order to provide better user experience for the user, it is necessary to consider a situation that seamless service experience can still be provided for the user even after the user changes the user device. In other words, even if the user changes the user device, such as the mobile device, it is necessary to enable the user to unlock the vehicle by using the changed mobile device. Therefore, after the user changes the mobile device, how to facilitate the user to use the new user device to unlock the vehicle becomes a problem worth considering.

To solve the above problems and other potential problems, an exemplary embodiment of the present disclosure proposes a solution for managing a virtual key of an object. This solution includes: at a mobile device, receiving first verification information from a server and related to a first user device of the object; determining whether the received first verification information is matched with second verification information related to the to-be-used mobile device of the object; in response to determining that the first verification information is mismatched with the second verification information, sending a virtual key request to the server, the virtual key request including an identifier of the object; and receiving the virtual key response from the server, the virtual key response including the virtual key of the object.

In the foregoing solution, by obtaining the first verification information related to the first user device via the server, and in the case that the second verification information of the to-be-used mobile device of the object is mismatched with the first verification information (e.g., mismatched or no longer matched), the virtual key request with the identifier of the object is sent to the server to obtain the virtual key of the object, so that the mobile device of the present disclosure can use the virtual key obtained via the server to open the object. By using this solution, the disclosure can continue to use the object conveniently and safely by using different terminals in the virtual key sharing scenario, for example, the shared object can be still used after the user changes a terminal.

The basic principles and a plurality of example implementations of the present disclosure are explained below with reference to the drawings.

FIG. 1 illustrates a schematic diagram of an environment 100 in which the embodiments of the present disclosure can be implemented. It should be understood that the environment 100 shown in FIG. 1 is only exemplary, and should not constitute any limitation on the realized function and scope described in the present disclosure.

As shown in FIG. 1, the environment 100 includes a vehicle 110, a user 120, a user device 150 and a server 160. The user 120 may be a driver or a specific passenger in the vehicle 110. The user device 150 may or may not be installed with a vehicle key application. The server 160 may interact information with the vehicle 110 and the user device 160.

The user device 150 may be a user device accessing network services through a mobile communication network, such as a smart phone, a tablet computer, a notebook computer, a smartband, smart glasses and/or a smart watch.

In the example of FIG. 1, the vehicle 110 is, for example, any type of vehicle that can carry people and/or things and move through power systems such as engines and battery power, including but not limited to cars, trucks, buses, cars, electric cars, motorcycles, recreational vehicles, trains, and the like. In some embodiments, one or more vehicles 110 in the environment 100 may be vehicles with certain automatic driving capability, and such vehicles are also referred to as unmanned vehicles. In some embodiments, the vehicle 110 may also be a vehicle without automatic driving capability.

A computing device 140 may be embedded in the vehicle 110. The computing device 140 includes, for example, an on-board infotainment, and an on-vehicle T-BOX, which may interact and share data with the user device 150, a roadside unit (not shown), and the server 160, for example, through wireless communication means such as a mobile communication network, an NFC (Near Field Communication), and Bluetooth.

The computing device 140 may also be an entity external to the vehicle 110 and may communicate with the vehicle 110 via a wireless network. The computing device 140 may be implemented as one or more computing devices.

The vehicle 110 includes at least one biological information acquiring module 130, which is configured for acquiring biological information of the user. The biological information acquiring module 130 may include, for example, an acoustic sensor for receiving voice input of the user 120, an image sensor for receiving face image input of the user 120, an acquisition device for receiving fingerprint information of the user 120, or an iris image device for receiving retina information of the user 120.

Figure 2:
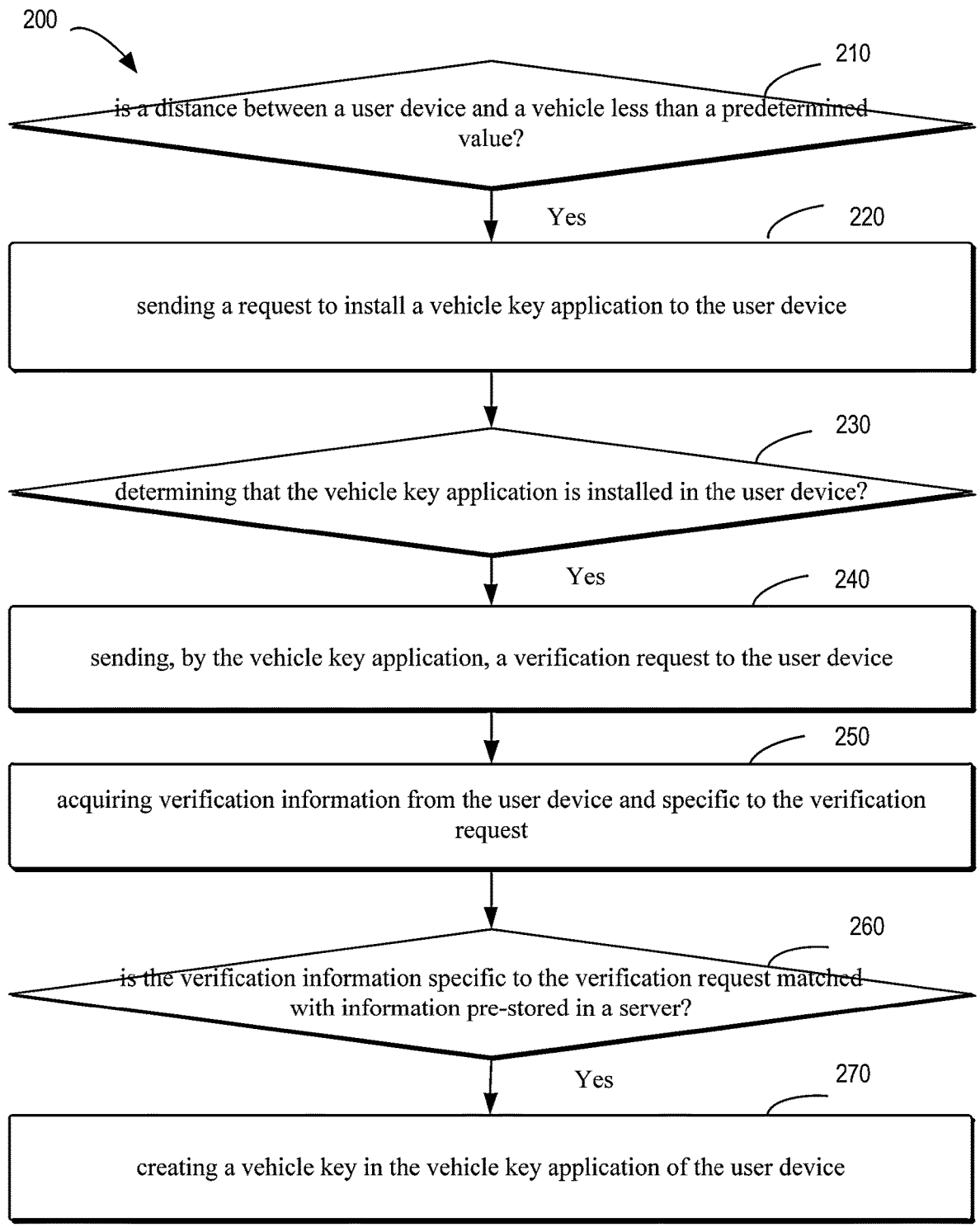
FIG. 2 illustrates a flow chart of a method 200 for creating a vehicle key according to an embodiment of the present disclosure.
Figure 3:
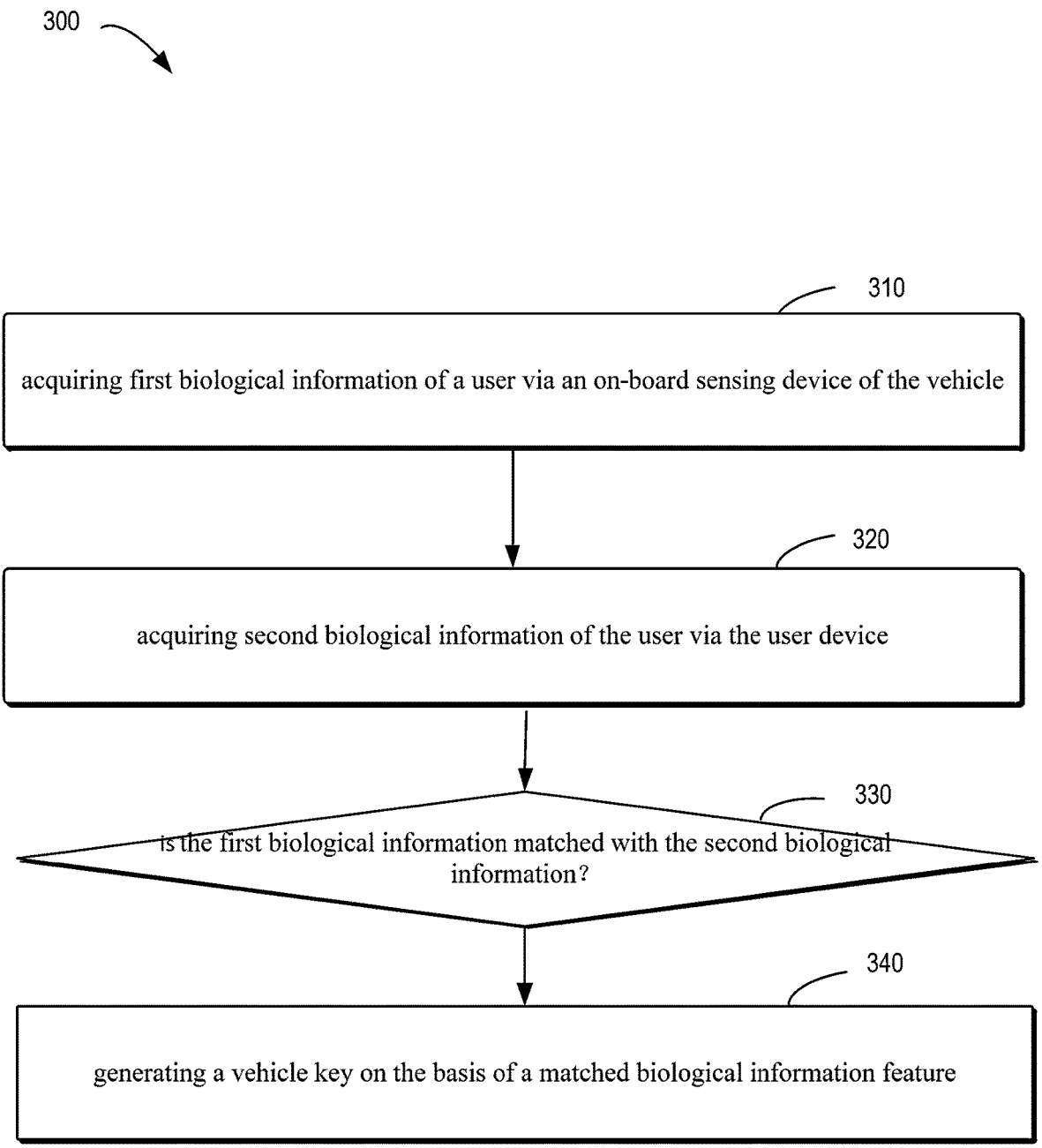
FIG. 3 illustrates a flow chart of a method 300 for generating a vehicle key on the basis of biological information according to an embodiment of the present disclosure.

The detailed process will be further described below with reference to FIG. 2 to FIG. 3. FIG. 2 illustrates a flow chart of a method 200 according to an embodiment of the present disclosure. The method 200 may be implemented by the computing device 140 in FIG. 1. For convenience of description, the method 200 will be described with reference to FIG. 1.

At box 210, the computing device 140 determines whether a distance between the user device 150 and the vehicle 110 is less than a predetermined value. The computing device 140 may measure the distance between the user device 150 having an NFC module and a Bluetooth module, and the vehicle 110 by using a distance sensor. In one example, the computing device 140 may determine that a distance between a mobile phone of the user and a door of the vehicle 110 is less than a predetermined distance, for example, 2 m. Here, the description is made by taking the mobile phone as an example, but this is not intended to limit the scope of the present disclosure.

It should be understood that network technologies known in the art (e.g., cellular networks (e.g., fifth generation (5G) networks, long term evolution (LTE) networks, third generation (3G) networks, code division multiple access (CDMA) networks), public land mobile networks (PLMN), local area networks (LAN), wide area networks (WAN), metropolitan area networks (MAN), telephone networks (e.g., public switched telephone network (PSTN)), private networks, ad self-organized networks, intranet, internet, fiber-based networks, and/or a combination of these or other types of networks) to establish the connection between the vehicle 110, the computing device 140, the user device 150 and the server 160, which will not be described in detail here.

At box 220, the computing device 140 sends a request to install a vehicle key application to the user device 150 if it is determined that the distance between the user device 150 and the vehicle 110 is less than the predetermined value. When detecting that the distance between the user device 150 and the vehicle 110 is less than 2 m, the computing device 140 sends the vehicle key application installed for controlling the vehicle 110 to the user through a self-provided communication module. The advantage of adopting the above technical means is that by actively sending the request to the user, the complexity of downloading and installing programs by the user is reduced, and the user experience is improved.

In one embodiment, the computing device 140 may detect a Bluetooth signal intensity between the user device 150 and the vehicle 110, determine the distance between the user device 150 and the vehicle 110 according to the Bluetooth signal intensity, and send the request to install the vehicle key application to the user device 150 when the distance is less than a preset distance.

It should be noted that the computing device 140 may detect the distance between the vehicle 110 and the user device 150 before sending the vehicle key application to the user device 150 according to different application scenarios; may also detect the distance between the vehicle 110 and the user device 150 before sending a verification request to the user device 150 through the vehicle key application; and may also detect the distance between the vehicle 110 and the user device 150 before acquiring verification information specific to the verification request from the user device 150. In the embodiment of the present invention, the distance between the vehicle 110 and the user device 150 may be detected by the same method, or the distance may be detected by the existing or future developed technologies. According to the embodiment of the present invention, by verifying the distance between the user device 150 and the vehicle 110, misoperation caused by the far distance between the user 120 and the vehicle 110 can be avoided.

In one embodiment, the vehicle 110 may push an installation website to the user device 150 so that the user 120 can log in to download the vehicle key application.

In an alternative embodiment, for example, in a region such as a basement where network signals are limited, the user device 150 may also join a wireless local area network created by the vehicle 110 to download and subsequently verify the vehicle key application.

At box 230, the computing device 140 detects whether the vehicle key application is installed in the user device 150. For example, the computing device 140 may detect whether url schema of the vehicle key application exists in the user device 150 through a communication module, and then judge whether the vehicle key application is installed in the user device 150 by the way of canOpenURL.

In one embodiment, the computing device 140 may determine whether the vehicle key application is installed in the user device 140 via a function such as canOpenURL provided in an operating system of the user device 150.

In another embodiment, the computing device 140 may traverse package names of all applications in the user device 150, and then determine whether a package name of the vehicle key application exists.

In one embodiment, a vehicle key application device for controlling the vehicle may also be pushed to the user device 150 by means of an applet.

At box 240, the computing device 140, in a case of detecting whether the vehicle key application is installed in the user device 150, sends a verification request to the user device 150 through the vehicle key application. For example, the computing device 140 may require the user 120 to input a verification code obtained by the user 120 from an operator in advance, or recognition information such as a driver's license stored by the user in the server 160 in advance. By actively sending the verification request to the user, it is convenient for the user to create the vehicle key more quickly.

At box 250, the computing device 140 acquires verification information specific to the verification request from the user device 150. For example, the user device 150 sends the verification information to the vehicle 110 through Bluetooth, an NFC or a mobile communication device for verification.

In one embodiment, the user device 150 may also send the verification information to the server 160 for verification, and then the server 160 may send an indication passing the verification to the computing device 140 to complete the verification.

In an alternative embodiment, the vehicle may also prompt the user to perform, for example, voice verification directly by a voice prompt or via the user device 150, and then a voice sensor on the vehicle 110 collects a voice of the user for voice verification. By verifying directly via the vehicle, the interaction between the network and the server side is reduced, which is beneficial to shorten the verification time.

At box 260, the computing device 140 determines whether the verification information specific to the verification request is matched with information pre-stored in a server. In one embodiment, the vehicle 110 may compare the information such as a verification code, a voice and a picture received from the user device 150 with corresponding verification information prestored in the server 160, and the computing device determines that these information are matched in response to that a similarity of the picture and the voice reaching a certain threshold or the verification codes are consistent.

At box 270, in the case that the computing device determines whether the verification information specific to the verification request is matched with the information pre-stored in the server, a vehicle key is created at the vehicle key application of the user device 150.

In one embodiment, after the vehicle key is created in the user device 150, the computing device may also detect whether a control instruction from the user device 150 is received via Bluetooth, an NFC or a mobile cellular network, and in a case that the computing device 140 confirms that the control instruction from the user device 150 is received, control the vehicle 110 to execute a vehicle control function selected by the user 120 in the vehicle key application via the user device 150. The vehicle control function includes unlocking a vehicle body, turning on or off an air conditioner, turning on or off a trunk, and turning on or off a vehicle engine.

In the foregoing solution, the vehicle key is created through a series of operations initiated by the vehicle 110, which is advantageous for the user to create the vehicle key quickly in the most convenient way.

A method 300 for generating a vehicle key by using biological information after the vehicle key is created in the user device 150 according to the embodiment of the present disclosure will be described hereinafter.

At box 310, the computing device 140 acquires first biological information of a user via an on-board sensing device of the vehicle. In an example, after the computing device 140 creates the vehicle key in the user device 150, the user 120 can enter the vehicle 110 through the vehicle key, and a virtual key pattern may appear on a vehicle screen to prompt the user 120 for further matching. The on-board sensing device includes an acquisition device for acquiring biological information, and the vehicle 110 may acquire the biological information of the user such as a fingerprint, a face image, an iris and a voice of the user via different types of on-board sensing devices. It should be noted that the above embodiments show that as an example of biological feature recognition, other methods may also be applied for biological feature acquisition and matching. Image, voice and fingerprint sensors already equipped with the present vehicle or devices developed in the future may be used as the on-board sensing devices.

At box 320, the computing device 140 acquires second biological information of the user via the user device 150. In one embodiment, the user device 140 may acquire the biological information of the user 120 through a built-in camera and a fingerprint acquisition device.

In an alternative embodiment, the biological information is a fingerprint or face image that is previously entered by the user 120 to unlock the user device 150.

At box 330, the computing device 140 determines whether the first biological information is matched with the second biological information. At box 340, the computing device, in the case that the biological information in the above mentioned steps are matched, generates the vehicle key on the basis of the matched biological information feature. In one example, the vehicle key may be generated using the biological feature extracted specific to at least one of the first biological information and the second biological information. In some embodiments, the method, in response to determining that the first biological information is matched with the second biological information, includes, for example: extracting, by the computing device 140, a first biological information feature specific to the first biological information; extracting a second biological information feature specific to the second biological information; and, if the computing device 140 determines that the first biological information feature is matched with the second biological information feature, determining that the first biological information is matched with the second biological information. The first biological information and the second biological information, for example, are eye images, while the first biological information feature and the second biological information feature, for example, are iris image features generated on the basis of the eye images. The advantage of matching and generating the vehicle key using the biological information features is that such features are unique and not easy to be stolen, thus enhancing the safety of the vehicle key.

The method of generating the iris image features on the basis of on the eye images may be characterized in various ways. In some embodiments, for example, the computing device 140 may shoot whole eyes of the user 120 via a camera device of the vehicle 110, and transmit a shot image to image preprocessing software of an iris recognition system. Then, the computing device 140 makes the image preprocessing software perform the following processing on the acquired iris images so as to make the iris images meet the requirements of extracting the iris features. Specifically, for example, (1) the computing device 140 may locate an iris region in the acquired eye image to generate an iris image.

The step of locating the iris region includes, for example: determining locations of an inner circle, a top circle and a quadratic curve in the image. The inner circle is a boundary between the iris and a pupil, the top circle is a boundary between the iris and a sclera, and the quadratic curve is a boundary between the iris and upper and lower eyelids. (2) The computing device 140 may normalize the iris image. The step of normalizing the iris image is: adjusting an iris size in the image to a fixed size set by the recognition system. (3) The computing device 140 may enhance the normalized iris image. For example, the normalized image is subjected to brightness, contrast and smoothness processing to improve a recognition rate of iris information in the image. (4) The computing device 140 may extract the iris image feature specific to the enhanced iris image. For example, the computing device 140 causes the image pre-processing software to extract feature points required for iris recognition from the iris image by using a specific algorithm and encode the feature points. Finally, the computing device 140 stores the feature codes obtained from the feature extraction locally, so as to match with the iris image feature codes stored in the user device 140 one by one, and judge whether the irises are the same, thus achieving the purpose of identity recognition. An anti-theft performance of the vehicle 110 is improved by using the uniqueness and difficult imitation of the iris feature. The user 120 may control the vehicle through the generated biological key.

In one example, when the user 120 approaches the vehicle 110, the computing device 140 detects the approach of the associated user device 150 and sends a prompt to the user device 150. In this case, the user 120 may unlock the vehicle by unlocking the user device (for example, brushing face or fingerprint), which adds further biological verification based on a traditional cloud key, greatly improving the security and convenience, and meanwhile, improving the convenience.

In one embodiment, the user 120 may want to authorize another user to use the vehicle. In this case, the user 120 may share the vehicle key created in the above steps with another user device of the another user, and the another user device may control the vehicle 110 through the shared key.

In another embodiment, the user 120 may set a valid time for the shared vehicle key. In this case, the another user may unlock and further control the vehicle 110 within the valid time.

In yet another embodiment, the user 120 may only want the another user to enter the vehicle 110 to pick up things. In this case, the user 120 may only set an authority of the shared vehicle key to unlock the vehicle, but may not perform operations such as starting the engine, which further enhances the safety.

In an alternative embodiment, the user 120 may video with the another user in the vehicle key application to collect face information of the another user, and the computing device 140 may generate a vehicle key in consideration of the face information to allow the another user to conveniently unlock and control the vehicle 110.

According to the embodiment of the present disclosure, the vehicle key for controlling the vehicle can be quickly created, and the safety is enhanced by further biological information verification. In addition, restricting the shared key is also convenient for the user to authorize the vehicle to other users.

Figure 4:
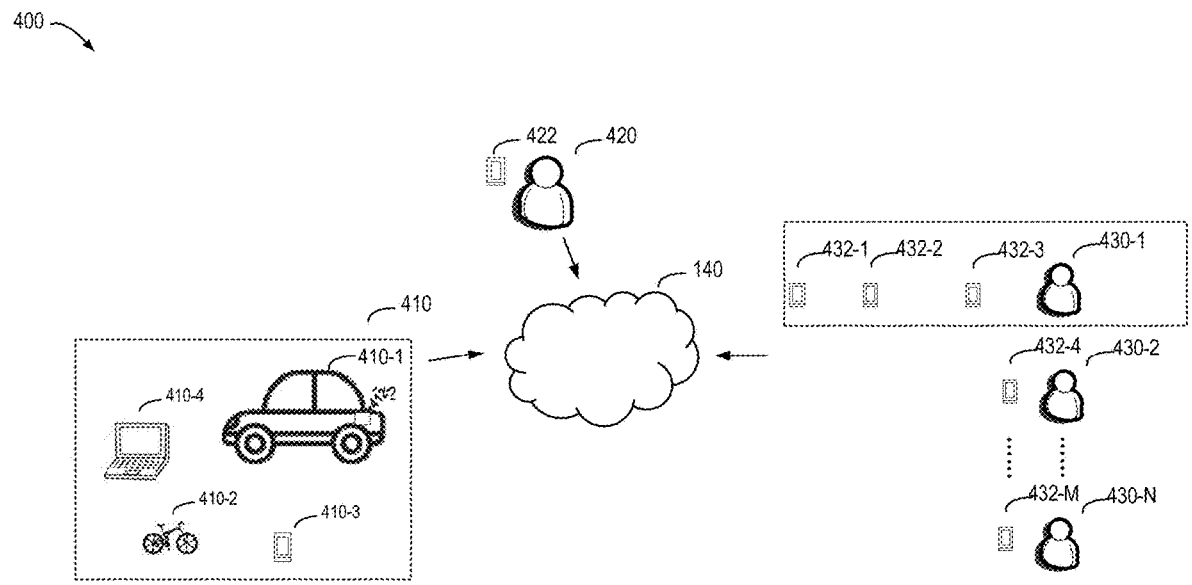
FIG. 4 illustrates a schematic diagram of an environment 400 in which some embodiments of the present disclosure can be implemented.

FIG. 4 illustrates a schematic diagram of an environment 400 in which some embodiments of the present disclosure can be implemented. As shown in FIG. 4, the environment 400 generally includes an object 410, a control system 442 of the object, a provider 420, a provider device 422, a user 430, a user device 432, a server 440, and the like. FIG. 4 only illustrates one exemplary environment 400 capable of implementing the embodiments of the present disclosure. It should be understood that the environment capable of implementing the embodiments of the present disclosure is not limited to this, and other environments may also be included.

As shown in FIG. 4, the object 410 may be a transportation means such as a motor vehicle 410-1 and a bicycle 410-2, or an electronic device such as a mobile device 410-3 and a notebook computer 410-4. It should be understood that the object 410 is not limited to those listed above, and may also include other types of objects.

Each object 410 may have the control system 442 of the object for controlling the object 410 to communicate with other parties and controlling the opening of the object. In one example, the control system 442 of the object may manage the virtual key. The on control system 442 of the object may also include a Bluetooth module to realize Bluetooth pairing, connection authentication services, and the like. In one example, the control system 442 of the object may provide the provider 420 with a vehicle control service (for example, controlling doors, windows, etc.) based on a Bluetooth channel through the provider device 422.

The provider 420 may be an individual, a company or an organization that provides the object 410. In other words, the provider 420 owns the object 410, for example, and may share the object 410 with devices of other parties, so that other users 430 can open the object 410. In one example, when the object 410 is the motor vehicle 410-1, the provider 420 may be an owner of the motor vehicle 410-1. The provider 420 may communicate with the control system 442 of the object 410 through the provider device 422 (e.g., an electronic device such as a mobile phone and a tablet computer) possessed by the provider 420. The provider device 422 may communicate with the control system 442 of the object using a plurality of communication modes, including but not limited to Bluetooth, an NFC (Near Field Communication) and other short-range communication modes.

In one example, the provider 420 may use the provider device 422 to initiate an activation request to the control system 442 of the object to obtain activation information (virtual key). In this way, the provider 420 may use the virtual key to open the object 410 (for example, starting a motor vehicle). For example, the obtained virtual key of the provider 420 will be stored in the server 440 for later use.

The user 430 may be an individual, a company or an organization that uses the object 410. The user 430 may own the user device 432. The user device 432 may be, for example, an electronic device such as a mobile phone or a tablet computer. The user device 432 may communicate with the control system 442 of the object using a plurality of communication modes. The communication modes include, but are not limited to Bluetooth, an NFC (Near Field Communication) and other short-range communication modes. Moreover, the user device 432 may also communicate with the provider device 422 or the server 440 via the above-mentioned methods.

In one example, the user device 432 of the user 430 may use the object 410 provided by the provider 420 with the authorization of the provider 420. For example, after being authorized by the vehicle owner, the user 430 may use the vehicle shared by the vehicle owner. In the process of sharing, for example, the server may generate a link of an HTML5 webpage for this sharing. The server 440 or the provider 420 may use various sharing methods to share the generated link with the user 430. The provider 420 may also specify a sharing method through the provider device 422.

The sharing methods include, but are not limited to, WeChat (for example, entering an applet by clicking an applet icon of the virtual key), SMS (for example, through contact number, text description and links), email (for example, through text description and links), applications (for example, adding friends through the mobile phone key application APP to share directly), NFC (for example, two mobile phones are close to each other to share), smart watches, Bluetooth and WIFI (two mobile phones are in one network segment to automatically detect and share), two-dimensional codes (for example, by scanning the shared object 410), and so on. In addition, the provider 420 may also share the object 410 with a plurality of users 430-1, 430-2, . . . , 430-N. For convenience of description, the users 430-1, 430-2, . . . , 430-N, will hereinafter be collectively or individually referred to as the user 430.

In addition, one user 430 may also own a plurality of user devices 432. As shown in FIG. 4, since the user 430-1 may need to unlock the vehicle through different user devices in various scenarios, the user 430-1 may own a plurality of user devices 432-1, 432-2, 432-3, and the like. For example, when the user 430-1 uses the shared object 410 for the first time, the user device 432-1 opens the object, and when the shared object is used for the second time, the user device 432-2 opens the object.

In one embodiment, the user 430 may activate and obtain the virtual key for the first time by using the user device 432 (e.g., the first user device 432-1) after being authorized by the provider. The obtained virtual key will be stored in the server 440 for later use. When the user 430 changes a device, which means that the vehicle is unlocked by using the user device 432 (e.g., the mobile device 432-2) different from the last time, to provide better user experience for the user 430, it is necessary to continue to provide services for the user 430 after the user device is changed (e.g., from the first user device 432-1 to the mobile device 432-2). In other words, even if the user 430 uses the newly changed mobile device 432-2, the vehicle can be unlocked conveniently and quickly.

It should be understood that FIG. 4 only illustrates one example of the user 430 and the user device 432 in the practical application scenario, and the number of the users 430 and the user devices 432 is not limited to this.

The server 440 may be an independent server or a cloud platform composed of one or more servers. These servers, for example, may be located in different geographical locations and connected to each other through a network. The provider device 422, the user device 432, and the control system 442 of the object may all communicate with the server 440 in various ways. These communication modes include, but are not limited to, various long-distance wireless communication modes and wired communication modes such as cellular network and Internet. Moreover, the provider device 422, the user device 432, and the control system 442 of the object may also communicate with each other via the server 440.

It can be understood that the above environment can support a variety of virtual key application scenarios, including but not limited to application scenarios as using the vehicle by the vehicle owner, using the vehicle by family members, lending the vehicle to others, sharing or renting the vehicle, and fleet or group vehicles, and the like.

Figure 5:
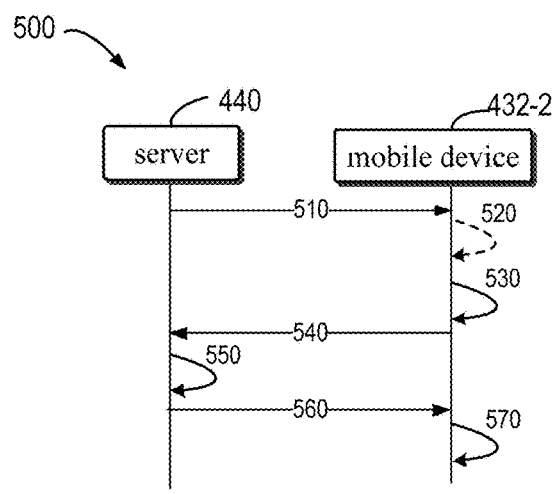
FIG. 5 illustrates a flow chart of a method 500 for managing an object according to an embodiment of the present disclosure.

FIG. 5 illustrates a flow chart of a method 500 for managing the object 410 according to an embodiment of the present disclosure. It should be understood that the method 500 may further include additional actions which are not shown and/or the illustrated actions may be omitted, and the scope of the present disclosure is not limited in this respect. For convenience of description, the method 500 will be described with reference to FIG. 4.

At 510, and at the mobile device 432-2, first verification information from the server 440 and related to the first user device 432-1 of the object 410 (not shown in FIG. 5) may be received. In some embodiments, the user 430 may log in to an application APP (e.g., an applet running on the mobile phone side for the virtual key of the vehicle) on the mobile device 432-2 through a user name and a password of the user 430, so as to communicate with the server 440 to receive the first verification information from the 440 and related to the first user device 432-1 of the object 410. In some other embodiments, the application APP may also be logged in by means of face, voiceprint, ID card, iris, coded lock, NFC, etc., to receive the first verification information from the 440 and related to the first user device 432-1 of the object 410. Additionally, when the application APP is not installed in the mobile device 432-2 of the user 430, the mobile device may also be prompted to download and install the application APP.

In one example, the first verification information may be an IMEI (International Mobile Equipment Identity) of the first user device 432-1. IMEI is configured for identifying each independent mobile phone and other mobile communication devices in the mobile phone network. The first user device 432-1 is, for example, the user device used by the user 430 when logging in to the application APP last time and using the virtual key. It can be understood that this scenario may be, for example, when the user changes an SIM card from one device to another.

In another example, the first verification information may also be a public key previously used by the user in the process of obtaining the shared virtual key by using the first user device 432-1 and unlocking the vehicle.

At 530, the mobile device 432-2 may determine that whether the received first verification information is mismatched with second verification information of the to-be-used mobile device 432-2 of the object 410.

In some embodiments, the second verification information may be an international mobile equipment identity IMEI of the device (i.e., the mobile device 432-2) currently used by the user 430. In some other embodiments, the second verification information may also be a public key obtained by the user 430 on the mobile device 432-2 that is currently used.

Alternatively, the way to obtain the public key of the mobile device 432-2 may be that the public key is locally generated by the mobile device 432-2 (as shown in step 520 in FIG. 5). For example, the mobile device 432-2 may locally generate a key certificate, thereby obtaining a public key and a private key based on the generated key certificate. In this way, the public key and the private key of the mobile device 432-2 can be obtained only with the participation of the mobile device 432-2, thereby simplifying the process of obtaining the public key and the private key, improving the response speed and enhancing the experience of the user 430 when changing the user device 432.

Moreover, the way to obtain the public key of the mobile device 432-2 may also be that the mobile device 432-2 obtains a key certificate from the server 440 or other third-party device, so as to generate a public key and a private key based on the obtained key certificate. The advantage of obtaining the key certificate from the third party is that the safety can be improved.

How to use the obtained public key and private key of the user will be described in detail later. It should be understood that the public key and the private key may also be configured for authentication verification and encryption procedures. The authorization and encryption procedures may be, for example, implemented using an RSA algorithm. As this RSA algorithm is a general asymmetric encryption algorithm in the industry, the details thereof will not be described in detail here.

In another example, the way to obtain the public key of the mobile device 432-2 may also be that the mobile device 432-2 obtains a key certificate from a third-party device, and then generates a public key and a private key based on the key certificate acquired from the third-party device.

At 540, if the mobile device 432-2 determines that the first verification information is mismatched with the second verification information, a virtual key request is sent to the server 440. The virtual key request may include an identifier of the object 410. In some embodiments, when the first verification information (e.g., IMEI or public key) of the first user device 432-1 and the second verification information (e.g., IMEI or public key) of the mobile device 432-2 currently used by the user 430 are mismatched (e.g., different), it is judged that the 430 changes the user device 432. In other words, the user 430 changes the user device 432 from the first user device 432-1 to the mobile device 432-2. At this time, because the user 430 changed the device, while the newly changed mobile device 432-2 does not have a virtual key for opening the object 410, the mobile device 432-2 will send the virtual key request to the server 440. The virtual key request may include the identifier of the object 410. The identifier is configured for uniquely identifying the object 410. The identifier may be, for example, information such as a frame number of the vehicle.

At 550, after receiving the virtual key request from the to-be-used mobile device 432-2 of the object 410, the server 440 will acquire the virtual key of the object 410 based on the identifier of the object 410. In some embodiments, a user identification (e.g., user name, etc.) used by the user 430 when logging in to the application APP, the identifier of the object 410, and the virtual key obtained for the user 430 when using for the first time may be associatively stored in the server 440. In this way, after the server 440 receives the virtual key request, the server 440 may, according to the identifier of the object 410, obtain the virtual key stored in the server 440 by the user 430 for the user logging in to the application APP. The user may be the user 430 or other users.

At 560, the server 440 will send a virtual key response to the mobile device 432-2. The virtual key response includes the virtual key of the object 410, so that the mobile device 432-2 is capable of using the virtual key to use (for example, open) the object 410. In some embodiments, the server 440 may send the virtual key directly obtained thereby at 550 to the mobile device 432-2 through a virtual key response. In other words, in this implementation, the server 440 does not need to obtain a new virtual key for the user 430 because the user 430 changes the user device 432, but lets the user 430 continue to use the virtual key assigned to the user 430 last time. In this way, the process of changing the virtual key due to changing the user device 432 can be avoided, and the speed of acquiring the virtual key after the user 430 changes the user device 432 can be improved.

However, it can be understood that for other reasons (e.g., safety factors), the process of changing the virtual key when changing the user device 432 at any time may be determined by the user 430 or automatically triggered by a background. This process may be realized by any existing process for changing the virtual key. In other words, independent processes for changing the virtual key and changing the mobile device may be designed.

At 570, the mobile device 432-2 may receive the virtual key response from the server 440. The virtual key response includes the virtual key of the object 410, so that the mobile device 432-2 is capable of using the virtual key to open the object 410.

Alternatively or additionally, the mobile device 432-2 may also include the public key of the mobile device 432-2 in the virtual key request. In this way, after receiving the public key, the server 440 may use the public key of the mobile device to encrypt the virtual key to be sent to the mobile device 432-2, and then send the encrypted virtual key to the mobile device 432-2, thereby improving the security of communication between the mobile device 432-2 and the server 440.

Meanwhile, the server 440 may associatively store the public key and the identifier of the user 430 (e.g., the user name used by the user 430 to log in to the application). In this way, in the subsequent process, if the user 430 changes the user device 432 again, the user 430 can still log in to the application APP by using an identifier of the user name to obtain the public key used by the user 430 last time, which is helpful for judging whether the user 430 changes the user device 432 as described in step 530.

Thereafter, after receiving the encrypted virtual key, the mobile device 432-2 may decrypt the encrypted virtual key using the private key of the mobile device 432-2 mentioned above to obtain a decrypted virtual key. In this way, the user device 432-2 may use the decrypted virtual key to unlock the vehicle.

Figure 6:
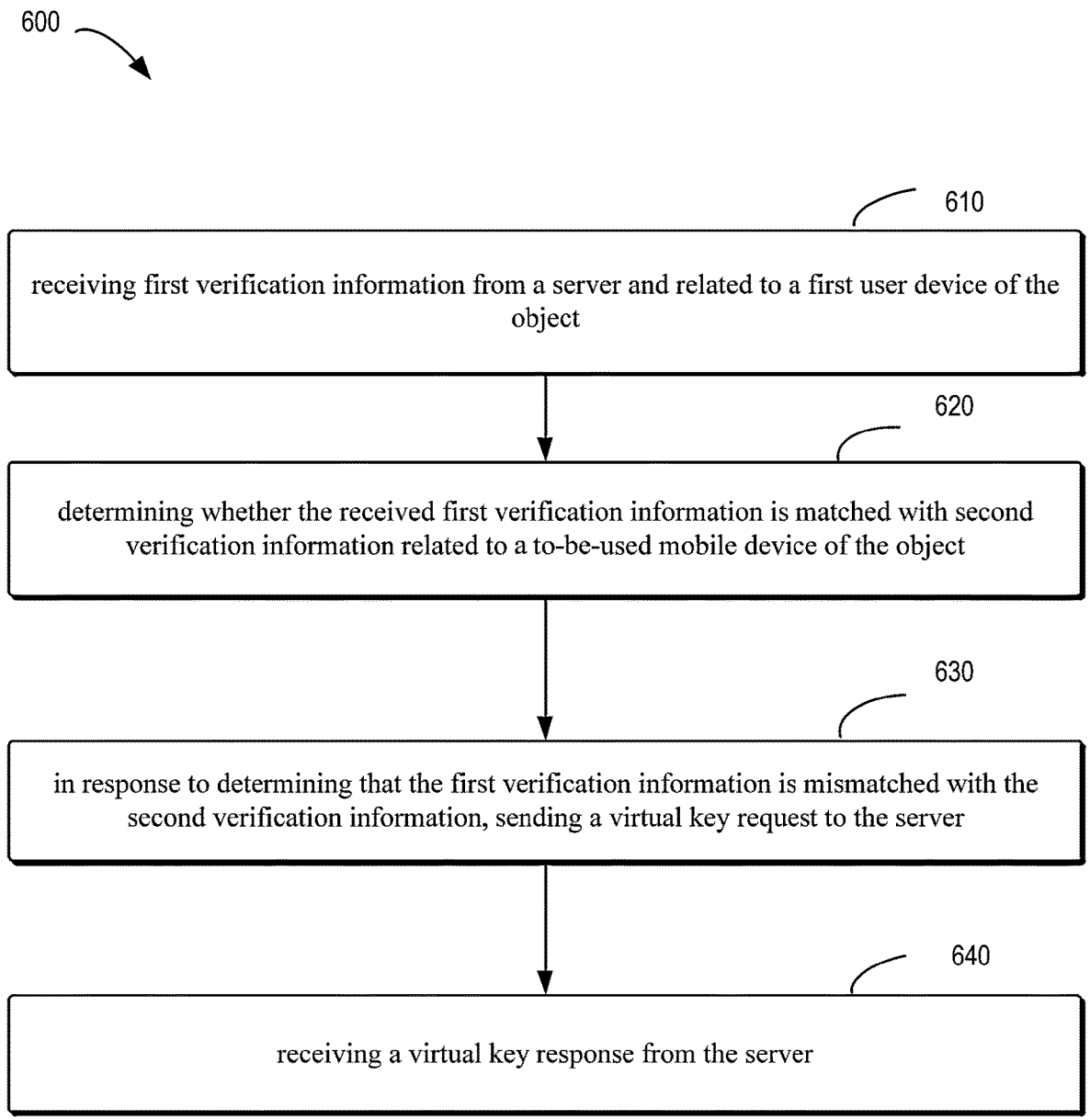
FIG. 6 illustrates a flow chart of a method 600 executed at a mobile device according to an embodiment of the present disclosure.

FIG. 6 illustrates a flow chart of a method 600 executed at the mobile device 432-2 according to an embodiment of the present disclosure. It should be understood that the method 600 may further include additional actions which are not shown and/or the illustrated actions may be omitted, and the scope of the present disclosure is not limited in this respect. For convenience of description, the method 600 will be described with reference to FIG. 4.

At 610, at the mobile device 432-2, the first verification information from the server 440 and related to the first user device 432-1 of the object 410 is received. In one example, the first verification information may be an IMEI (International Mobile Equipment Identity) of the first user device 432-1. The first user device 432-1 is, for example, the user device used by the user 430 when logging in to the application APP last time and using the virtual key.

At 620, it is determined whether the received first verification information is matched with the second verification information of the to-be-used mobile device 432-2 of the object 410. In some embodiments, the first verification information related to the first user device 432-1 includes at least one of the following: the IMEI (International Mobile Equipment Identity) IMEI of the first user device 432-1; and the public key of the first user device 432-1; moreover, the second verification information includes at least one of the following: the IMEI (International Mobile Equipment Identity) IMEI of the mobile device 432-2; and the public key of the mobile device 432-2. In this way, that mobile device 432-2 may identify whether the user 430 change the user device 432 by the IMEI used to uniquely identify the device or by the public key.

At 630, if the mobile device 432-2 determines that the first verification information is mismatched with the second verification information, a virtual key request is sent to the server 440, the virtual key request including the identifier of the object 410. In some embodiments, when the first verification information (e.g., IMEI or public key) of the first user device 432-1 and the second verification information (e.g., IMEI or public key) of the mobile device 432-2 currently used by the user 430 are mismatched (e.g., different), it is judged that the 430 changes the user device 432.

At 640, the mobile device 432-2 receives a virtual key response from the server 432-2, the virtual key response including the virtual key of the object 410, so that the mobile device 432-2 is capable of using the virtual key to open the object 410.

In the foregoing solution, the mobile device obtains the first verification information related to the first user device via the server, and when that the second verification information of the mobile device is mismatched with the first verification information, sends the virtual key request with the identifier of the object to the server to obtain the virtual key of the object, so that the mobile device of the present disclosure can still use the object conveniently and safely by using different terminals under a virtual key sharing scenario, for example, the user can continue to use the shared object after changing the terminal.

In some embodiments, the method 600 further includes: acquiring a public key of the mobile device 432-2, the public key being included in the virtual key request, so that the server 440 encrypts the virtual key on the basis of the public key. In some embodiments, the step of acquiring the public key of the mobile device 432-2 includes: generating a key certificate at the mobile device 432-2; and on the basis of the generated key certificate, acquiring the public key.

The method 600 further includes: acquiring a private key of the mobile device 432-2; and decrypting the encrypted virtual key on the basis of the private key.

Figure 7:
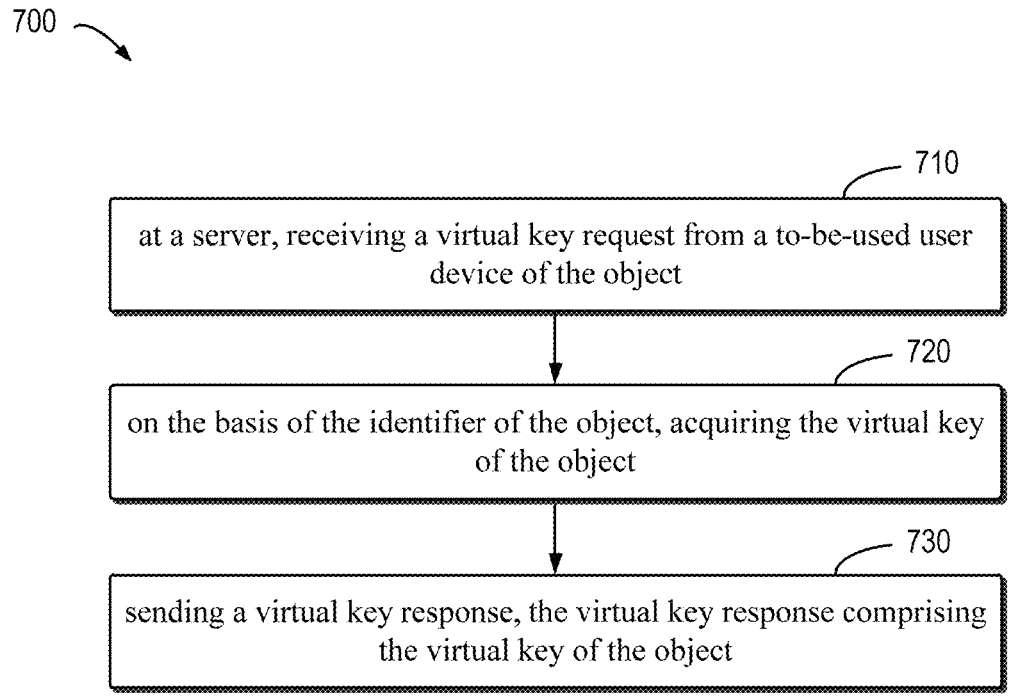
FIG. 7 illustrates a flow chart of a method 700 executed at a server according to an embodiment of the present disclosure.

FIG. 7 illustrates a flow chart of a method 700 executed in the server 440 according to an embodiment of the present disclosure. It should be understood that the method 700 may further include additional actions which are not shown and/or the illustrated actions may be omitted, and the scope of the present disclosure is not limited in this respect. For convenience of description, the method 700 will be described with reference to FIG. 4.

At 710, at the server 440, the virtual key request from the to-be-used mobile device 432-2 of the object 410 is received, the virtual key request including the identifier of the object 410. In some embodiments, the user identification (e.g., user name, etc.) used by the user 430 when logging in to the application APP, the identifier of the object 410, and the virtual key obtained for the user 430 when using for the first time may be associatively stored in the server 440. In this way, after the server 440 receives the virtual key request, the server 440 may, according to the identifier of the object 410, obtain the virtual key stored in the server 440 by the user 430 for the user logging in to the application APP. The user may be the user 430 or other users.

At 720, on the basis of the identifier of the object 410, a virtual key of the object 410 is acquired.

At 730, a virtual key response is sent, the virtual key response including the virtual key of the object 410, so that the user device 432 is capable of using the virtual key to open the object 410. In some embodiments, the virtual key request further a public key of the user device 432, associatively storing the public key and an identifier of the user 430, the user 430 being associated with the user device 432; and on the basis of the public key, encrypting the virtual key.

Figure 8:
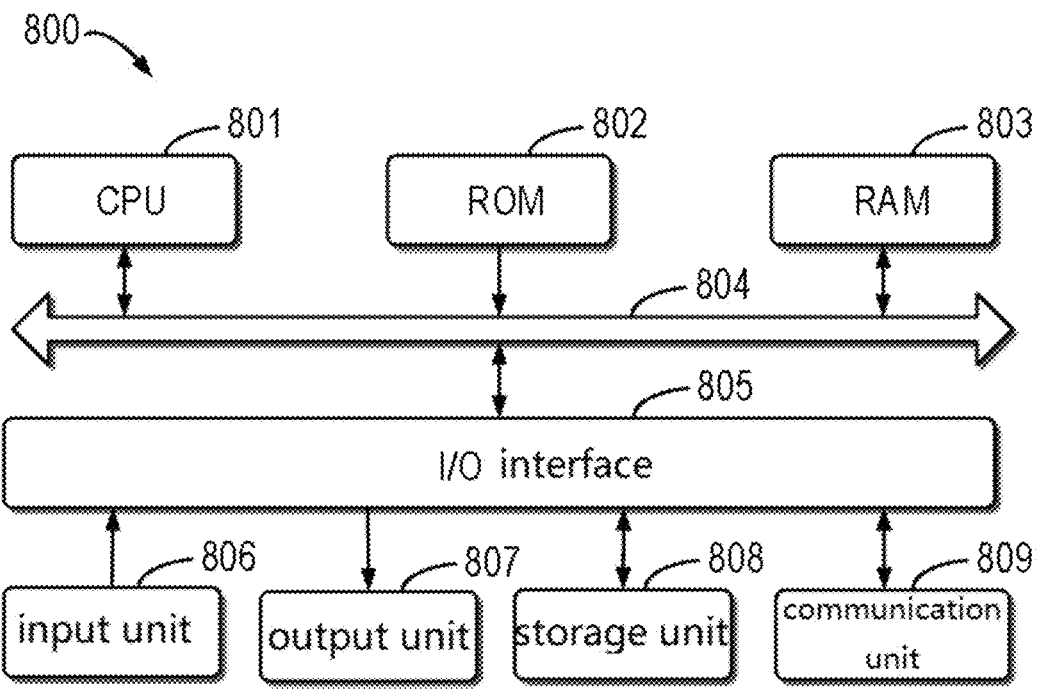
FIG. 8 illustrates a schematic block diagram of an example device 800 that may be used to implement the embodiments of the present disclosure.

FIG. 8 schematically illustrates a block diagram of an electronic device 800 suitable for implementing the embodiments of the present disclosure. The device 800 may be configured for implementing one or more hosts of the user device 150 and the server 160 shown in FIG. 1, and may also be configured for implementing one or more hosts of the user device 432 and the server 440 shown in FIG. 4. As shown in the figure, the device 800 includes a central processing unit (CPU) 801, which can perform various appropriate actions and processes according to a computer program instruction stored in a read-only memory (ROM) 802 or loaded from a storage unit 808 into a random access memory (RAM) 803. In the RAM 803, various programs and data needed for operating the device 800 may also be stored. The CPU 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard, a mouse, and the like; an output unit 807, such as various types of displays, speakers, and the like; a storage unit 808, such as a magnetic disk, an optical disk, and the like; and a communication unit 809, such as a network card, a modem, a wireless communication transceiver, and the like. The communication unit 809 allows the device 800 to exchange information/data with other devices through a computer network such as the Internet and/or various telecommunication networks.

The processing unit 801 executes various methods and processes described above, such as executing the methods 200 and 300 for creating a vehicle key. For example, the methods 500, 600, and 700 for managing the virtual key of the object 110 are executed. For example, in some embodiments, the methods 200, 300, 500, 600 and 700 may be implemented as a computer software program, which is tangibly embodied in a machine-readable medium, such as the storage unit 808. In some embodiments, a part or all of the computer program may be loaded and/or installed on the device 800 via the ROM 802 and/or the communication unit 809. When the computer program is loaded into the RAM 803 and executed by the CPU 801, one or more operations of the methods 200, 300, 500, 600 and 700 described above may be executed. Alternatively, in other embodiments, the computing unit 801 may be configured to execute one or more operations of the methods 200, 300, 500, 600 and 700 by any other suitable means (for example, by means of firmware).

The present disclosure may be a, a device or a computer-readable storage medium carrying a computer-readable program instruction for performing various aspects of the present disclosure.

The computer-readable storage medium may be a tangible device that can hold and store an instruction used by an instruction executing device. The computer-readable storage medium may be, for example, but not limited to, an electrical storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a random access memory (RAM), a read-only memory (ROM), an erasable programmable read-only memory (ROM) (EPROM or flash memory), a static random access memory (SRAM), a portable compact disc read-only memory (CD-ROM), a digital versatile disc (DVD), a memory stick, a floppy disc, a mechanical coding device, such as a punch card or a bulge structure in a groove on which an instruction is stored, or any suitable combination of the above. The computer-readable storage medium used here is not interpreted as instantaneous signals, such as radio waves or other freely propagated electromagnetic waves, electromagnetic waves propagated through waveguides or other transmission media (for example, light pulses through fiber optic cables), or electrical signals transmitted through electric wires.

The computer-readable storage medium used here may be downloaded from a computer-readable storage medium to various computing/processing devices, or downloaded to an external computer or an external storage device through a network, such as the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives a computer-readable program instruction from the network and forwards the computer-readable program instruction for storage in the computer-readable storage medium in each computing/processing device.

The computer program instruction for performing operations of the present disclosure may be an assembly instruction, an Instruction Set Architecture (ISA) instruction, a machine instruction, a machine-related instruction, a microcode, a firmware instruction, status setting data, or a source code or an object code written in one programming language or any combination of more programming languages. The programming languages include object-oriented programming languages such as Smalltalk, C++, and conventional procedural programming languages such as "C or similar programming languages. The computer-readable program instructions may be executed entirely on a user computer, partially executed on the user computer, executed as an independent software package, partially executed on the user computer and partially executed on a remote computer, or entirely executed on the remote computer or a server. In the case of involving in the remote computer, the remote computer can be connected to the user computer via any kind of network, including a local area network (LAN) or a wide area network (WAN), or can be connected to an external computer (e.g., connected via the Internet using an Internet service provider). In some embodiments, electronic circuits, such as a programmable logic circuit, a field programmable gate array (FPGA), or a programmable logic array (PLA), can be customized by utilizing the status information of the computer-readable program instruction. The electronic circuits can execute the computer-readable program instruction, thereby implementing various aspects of the present disclosure.

Various aspects of the present disclosure have been described with reference to the flow charts and/or block diagrams of the method, device, and computer-readable storage medium according to the embodiments of the present disclosure. It should be understood that each block of the flow chart and/or block diagram and combinations of the blocks in the flow chart and/or block diagram can be implemented by computer-readable program instructions.

These computer-readable program instructions may be provided to a general purpose computer, a special purpose computer, or a processor of other programmable data processing device to produce a machine for the instructions executed by the computer or the processor of other programmable data processing device to generate an apparatus for implementing the functions/actions specified in one or more blocks of the flow chart and/or block diagram. These computer-readable program instructions may also be stored in a computer-readable memory. These instructions enables the computer, the programmable data processing device and/or other device to work in a given manner, so that the computer-readable medium stored with instructions includes a product including an instruction that implements various aspects of the functions/actions specified in one or more blocks of the flow chart and/or block diagram.

These computer-readable program instructions may also be loaded to a computer, other programmable data processing device, or other apparatus, so that a series of operating steps are executed on the computer, the other programmable data, or the other apparatus to produce processing implemented by the computer, so that the instructions executed in the other programmable data, or the other apparatus implement the functions/actions specified in one or more blocks of the flow chart and/or block diagram.

The flow charts and block diagrams in the drawings show the possibly implemented architectures, functions, and operations of the method, the device and the computer-readable storage medium according to multiple embodiments of the present disclosure. In this regard, each block in the flow chart or block diagram may represent one module, one program segment, or a part of an instruction. The module, the program segment, or the part of an instruction contains one or more executable instructions for implementing specified logical functions. In some alternative implementations, the functions noted in the blocks may also occur in a different order from those noted in the drawings. For example, two consecutive blocks may actually be executed in substantially parallel, and sometimes may be executed in reverse order, depending on the functions involved. It should also be noted that each block in the block diagrams and/or flow charts, and combinations of the blocks in the block diagrams and/or flow charts, may be implemented with dedicated hardware-based systems that perform specified functions or actions, or may be implemented with combinations of dedicated hardware and computer instructions.

Various embodiments of the present disclosure have been described above, and the above description is exemplary, not exhaustive, and is not limited to the disclosed embodiments. Many modifications and variations will be apparent to those of ordinary skills in the art without departing from the scope and spirit of the illustrated embodiments. Terms used herein are selected to best explain the principles and practical applications of various embodiments or technical improvements to technologies in the market, or to enable other people of ordinary skills in the art to understand various embodiments disclosed herein.

The above descriptions are only optional embodiments of the present disclosure, and are not used to limit the present disclosure. Many modifications and variations will be apparent to those of ordinary skills in the art. Any change, equivalent substitution, and improvement made within the spirit and principle of the present disclosure shall fall within the protection scope of the present disclosure.

The invention claimed is:

1. A method for managing a virtual key of an object, wherein the method comprises:
receiving, by a mobile device, first verification information related to a first user device of the object from a server;
determining whether the received first verification information is matched with second verification information related to the to-be-used mobile device of the object;
in response to determining that the first verification information is mismatched with the second verification information, sending a virtual key request to the server, wherein the virtual key request comprises an identifier of the object; and receiving a virtual key response from the server, wherein the virtual key response comprises the virtual key of the object, to allow the mobile device to be capable of using the virtual key to open the object.

2. The method according to claim 1, further comprising:
acquiring a public key of the mobile device, wherein the public key is comprised in the virtual key request, to allow the server to encrypt the virtual key on the basis of the public key.

3. The method according to claim 2, wherein the step of acquiring a public key of the mobile device comprises:
generating a key certificate at the mobile device; and
acquiring the public key on the basis of the generated key certificate.

4. The method according to claim 2, further comprising:
acquiring a private key of the mobile device; and
decrypting the encrypted virtual key on the basis of the private key.

5. The method according to claim 1, wherein the first verification information related to the first user device comprises at least one of the following:
an international mobile equipment identity IMEI of the first user device; and
a public key of the first user device;
wherein the second verification information comprises at least one of the following:
an international mobile equipment identity IMEI of the mobile device; and
a public key of the mobile device.

6. A method for managing a virtual key of an object, comprising:
receiving, by a server, a virtual key request from a to-be-used user device of the object, wherein the virtual key request comprises an identifier of the object, the virtual key request is a virtual key request that is sent to the server by the to-be-used user device of the object in response to determining that first verification information is mismatched with second verification information, the first verification information is first verification information from the server and related to a first user device of the object, and the second verification information is second verification information related to the to-be-used user device of the object;
acquiring the virtual key of the object on the basis of the identifier of the object; and
sending a virtual key response, wherein the virtual key response comprises the virtual key of the object that is acquired by the server on the basis of the identifier of the object, to allow the user device to be capable of using the virtual key to open the object.

7. The method according to claim 6, wherein the virtual key request further comprises a public key of the user device, the method further comprises:
storing the public key and an identifier of a user, associatively, wherein the user is associated with the user device; and
encrypting the virtual key, on the basis of the public key.

8. An electronic device, comprising:
a processing unit; and
a memory coupled to the processing unit and containing an instruction stored thereon, wherein the instruction, when executed by the processing unit, causes the device to execute the steps of the method according to claim 1.

9. An electronic device, comprising:
a processing unit; and
a memory coupled to the processing unit and containing an instruction stored thereon, wherein the instruction, when executed by the processing unit, causes the device to execute the steps of the method according to claim 6.

10. A computer-readable medium storing a computer-executable instruction thereon, wherein the machine-executable instruction when executed, causes the computer to execute the steps of the method according to claim 1.

11. The method according to claim 1, wherein the first user device is a user device used by a user when logging in to an application last time and using the virtual key.

12. The method according to claim 1, wherein in response to the first verification information of the first user device and the second verification information of the mobile device currently used by a user being mismatched, it is judged that the user has changed the user device.

13. The method according to claim 6, wherein the first user device is a user device used by a user when logging in to an application last time and using the virtual key.

14. The method according to claim 6, wherein in response to the first verification information of the first user device and the second verification information of a mobile device currently used by a user being mismatched, it is judged that the user has changed the user device.

* * * * *